US011267043B2

(12) United States Patent
Bevc et al.

(10) Patent No.: US 11,267,043 B2
(45) Date of Patent: Mar. 8, 2022

(54) TOOL AND METHOD FOR PRESSING AN AUXILIARY JOINING ELEMENT TOGETHER WITH A WORKPIECE FORMED SEPARATELY FROM THE AUXILIARY JOINING ELEMENT, IN PARTICULAR FOR PRODUCING A MOTOR VEHICLE

(71) Applicant: Bayerische Motoren Werke Aktiengesellschaft, Munich (DE)

(72) Inventors: Boris Bevc, Munich (DE); Robert Kirschner, Olching (DE); Robert Lindacher, Hilgertshausen-Tandern (DE); Mario Meinhardt, Munich (DE); Dietmar Opel, Moosburg a.d. Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/259,222

(22) PCT Filed: Jun. 14, 2019

(86) PCT No.: PCT/EP2019/065666
§ 371 (c)(1),
(2) Date: Jan. 11, 2021

(87) PCT Pub. No.: WO2020/011485
PCT Pub. Date: Jan. 16, 2020

(65) Prior Publication Data
US 2021/0252586 A1 Aug. 19, 2021

(30) Foreign Application Priority Data

Jul. 12, 2018 (DE) .................... 10 2018 211 566.4

(51) Int. Cl.
*B21J 15/02* (2006.01)
*B21J 15/36* (2006.01)
(Continued)

(52) U.S. Cl.
CPC ............... *B21J 15/36* (2013.01); *B21J 15/02* (2013.01); *F16F 1/028* (2013.01); *F16F 1/373* (2013.01)

(58) Field of Classification Search
CPC ... B21J 15/36; B21J 15/02; B21J 15/10; B21J 15/142; Y10T 29/49947; Y10T 29/49954;
(Continued)

(56) References Cited

U.S. PATENT DOCUMENTS 3,646,660 A * 3/1972 Sheffer, Jr. ............... B21J 15/14
29/243.53
3,802,060 A * 4/1974 Gross ....................... B21J 15/32
29/464
(Continued)

FOREIGN PATENT DOCUMENTS

CA 2109971 C 5/1994
DE 1 013 945 A 11/1951
(Continued)

OTHER PUBLICATIONS

International Search Report (PCT/ISA/210) issued in PCT Application No. PCT/EP2019/065666 dated Sep. 6, 2019 with English translation (four (4) pages).
(Continued)

*Primary Examiner* — Jason L Vaughan
*Assistant Examiner* — Amanda Kreiling
(74) *Attorney, Agent, or Firm* — Crowell & Moring LLP

(57) ABSTRACT

A tool for pressing at least one auxiliary joining element together with a workpiece formed separately from the auxiliary joining element, includes two tool elements which can move towards one another along a movement direction and can thereby move out of an open position into a closed position, between which the workpiece and the auxiliary joining element can be arranged, such that the auxiliary
(Continued)

joining element can be pressed together with the workpiece in a joining region of the workpiece by moving the tool elements into the closed position. At least one spring element is retained on the tool elements, and is elastically deformable along the movement direction and thereby transferable out of an initial state into a deformation state, and adopts the initial state in the open position of the tool elements. The workpiece can be supported at least in the open position on the spring element.

9 Claims, 2 Drawing Sheets

(51) Int. Cl.
*F16F 1/02* (2006.01)
*F16F 1/373* (2006.01)

(58) Field of Classification Search
CPC ......... Y10T 29/49956; Y10T 29/53996; Y10T 29/5377; Y10T 29/49908
See application file for complete search history.

(56) References Cited

U.S. PATENT DOCUMENTS

| | | | |
|---|---|---|---|
| 7,401,394 | B1 | 7/2008 | Müller |
| 2005/0025564 | A1 | 2/2005 | Humpert et al. |
| 2016/0129493 | A1* | 5/2016 | Breen ................... B21D 37/08 |
| | | | 72/337 |
| 2017/0349221 | A1* | 12/2017 | Yamada ............... B62D 27/023 |

FOREIGN PATENT DOCUMENTS

| | | |
|---|---|---|
| DE | 42 24 994 A1 | 2/1994 |
| DE | 42 39 584 A1 | 5/1994 |
| DE | 102 20 291 A1 | 12/2002 |
| DE | 696 30 901 T2 | 9/2004 |
| DE | 10 2016 111 616 A1 | 12/2017 |
| EP | 0 993 902 A2 | 4/2000 |
| WO | WO 01/03881 A1 | 1/2001 |

OTHER PUBLICATIONS

German-language Written Opinion (PCT/ISA/237) issued in PCT Application No. PCT/EP2019/065666 dated Sep. 6, 2019 with English translation (five (5) pages).
German-language Search Report issued in German Application No. 10 2018 211 566.4 dated Jan. 18, 2019 with partial English translation (14 pages).

* cited by examiner

TOOL AND METHOD FOR PRESSING AN AUXILIARY JOINING ELEMENT TOGETHER WITH A WORKPIECE FORMED SEPARATELY FROM THE AUXILIARY JOINING ELEMENT, IN PARTICULAR FOR PRODUCING A MOTOR VEHICLE

BACKGROUND AND SUMMARY OF THE INVENTION

The invention relates to a tool for pressing at least one auxiliary joining element together with a workpiece formed separately from the auxiliary joining element. Furthermore, the invention relates to a method for pressing at least one auxiliary joining element together with a workpiece formed separately from the auxiliary joining element.

EP 0 993 902 A2 discloses a method for attaching a functional component, in particular a fastening element, to a sheet-metal part, where appropriate in a liquid-tight and/or gas-tight form. It is provided in this case that the functional component is pressed against the sheet-metal part supported by a die and sheet-metal material is pressed by means of at least one movably mounted formed part of the die into an undercut of the functional component.

Furthermore, DE 696 30 901 T2 discloses a method for connecting a fastening element comprising a head portion, a shaft portion, and at least one radial groove in its shaft portion to a sheet-metal component by forming a hole in the sheet-metal component in such a manner that a material collar is formed which projects away from the sheet-metal component from a side of the sheet-metal component.

Furthermore, a device for the flush pressing-in of a module by means of a stamp in a recess of a card lying flat on a plate is known from DE 42 24 994 A1.

The problem addressed by the present invention is that of developing a tool and a method of the kind referred to above in such a manner that the auxiliary joining element can be connected to the workpiece in a particularly advantageous manner.

This problem is solved according to the invention by a tool and by a method according to the independent claims. Advantageous embodiments of the invention are the subject matter of the dependent claims.

A first aspect of the invention relates to a tool for pressing at least one auxiliary joining element together with a workpiece formed separately from the auxiliary joining element. By pressing the auxiliary joining element, which is also referred to as the functional component, together with the workpiece, the auxiliary joining element is connected to the workpiece formed separately from the auxiliary joining element. The feature whereby the auxiliary joining element is formed separately from the workpiece, or vice versa, should be understood to mean that the auxiliary joining element and the workpiece are configured as components formed separately from one another which are connected to one another. The workpiece is formed from a metal material, in particular a sheet metal, for example, so that the workpiece is configured as a metal sheet or as a sheet-metal part, for example. By way of example, the workpiece has an at least substantially two-dimensional form before the pressing of the auxiliary joining element together with the workpiece, so that the workpiece can be formed as a planar element, in particular as a blank and in this case preferably as a tailored blank, prior to the pressing of the auxiliary joining element together with the workpiece. As part of the pressing of the auxiliary joining element together with the workpiece, the auxiliary joining element is pressed in at least partially into the workpiece, for example, and thereby connected to the workpiece. During the pressing or pressing-in, a flow of material at least of the auxiliary joining element is induced, for example, wherein through this flow of the material of the auxiliary joining element, the auxiliary joining element is connected to the workpiece in an at least form-fitting manner, for example. In particular, the pressing can cause at least one wall region of the workpiece to be arranged between at least two further wall regions of the auxiliary joining element which are opposite one another and spaced apart from one another, for example, as a result of which the auxiliary joining element can be fixedly connected to the workpiece.

The workpiece and the auxiliary joining element connected to the workpiece form a structural unit, for example, which can be particularly advantageously connected via the auxiliary joining element, for example, to a further structural element, particularly in a substance-bonded manner. Consequently, it is possible for the workpiece to be connected to the structural element fixedly and particularly advantageously, particularly in a substance-bonded manner, by mediation of the auxiliary joining element. In this case, the structural element and the auxiliary joining element may be particularly advantageously welded to one another, for example.

The tool has two tool elements which are also referred to as tool halves. The tool elements can be moved towards one another along a movement direction, particularly in a translatory manner, and can thereby be moved from an open position into a closed position. In other words, the tool elements initially adopt their open position, for example, so that the tool elements can then be moved towards one another in a translatory manner along the movement direction, as a result of which the tool elements are then moved into their closed position or adopt the closed position. In the closed position, the tool elements are arranged closer to one another along the movement direction than in the open position. The tool in this case may be particularly configured as a press, the tool elements whereof are pressed to one another or against one another along the movement direction. If the workpiece and the auxiliary joining element are located between the workpiece elements during this, then the auxiliary joining element is pressed together with the workpiece by means of the press and thereby connected. This means that the workpiece and the auxiliary joining element can be arranged between the tool elements, so that the auxiliary joining element can be pressed together with the workpiece in a joining region of the workpiece by moving the tool elements into the closed position. This means that the auxiliary joining element is pressed together with the workpiece in the joining region of the workpiece and is thereby connected to the workpiece by the tool elements which are initially located in the open position being moved towards one another and thereby moved into the closed position, in particular while the auxiliary joining element and the workpiece are located between the workpiece elements.

Before pressing, for example, the auxiliary joining element is arranged in the joining region of the workpiece and in this case particularly on the workpiece. If the tool elements are then moved out of the open position into the closed position, while the workpiece and the auxiliary joining element arranged in the joining region are located between the workpiece elements along the movement direction, the auxiliary joining element is thereby pressed together with the workpiece in the joining region and thereby connected to the workpiece. There is preferably an at least virtually flush pressing, or pressing-in, of the auxiliary joining element with, or into, the workpiece, so that the auxiliary joining element pressed together with the workpiece, for example, ends, in other words is arranged, flush with a surface of the workpiece attached particularly immediately or directly to the auxiliary joining element after the pressing, both on a first side and on a second side facing away from the first side of the workpiece or of the auxiliary joining element.

In order to be able to connect the auxiliary joining element particularly advantageously and, in particular, particularly fixedly to the workpiece, at least one spring element, also referred to simply as a spring, is provided according to the invention, which spring element is retained on one of the tool elements. The one tool element is, in particular, that one of the tool elements on which the workpiece arranged between the tool elements is supported particularly downwards in a vertical direction, at least indirectly, in particular directly, while the tool elements are still located in the open position and while the workpiece and the auxiliary joining element are arranged between the tool elements along the movement direction. The spring element is at least partially elastically deformable along the movement direction and can thereby be transferred from an initial state into a deformation state. In the deformation state, the spring element is more severely elastically deformed, particularly along the movement direction, than in the initial state, wherein it is preferably provided that the spring element is not elastically deformed in the initial state, in other words, it is elastically undeformed. For example, the spring element exhibits a first length running along the movement direction in the initial state, wherein the spring element in the deformation state has a shorter second length running along the movement direction compared with the first length. In this case, at least one point of the spring element is retained on the one tool element, so that during the elastic deformation of the spring element from the initial state into the deformation state, for example, a translatory relative movement between the point of the spring element and the one tool element running along the movement direction and taking place relative to the one tool element is omitted.

The spring element adopts the initial state when the tool elements are in the open position. Since the spring element is elastically deformable along the movement direction, the spring element exhibits the first length extending along the movement direction in the starting state, for example, and the second length, which is smaller than the first length, extending along the movement direction in the deformation state. However, the point is arranged at the same point of the one tool element, both in the initial state and in the deformation state. Consequently, in the initial state an end of the spring element facing away from the one tool element has a first distance running along the movement direction, and in the deformation state a second distance running along the movement direction from the point of the spring element or of the one tool element and/or from the one tool element, wherein the first distance is greater than zero and greater than the second distance. The second distance may be greater than or, however, equal to zero. In the initial state and in the open position of the tool elements, for example, the spring element adopts a position or an orientation relative to the one tool element.

The workpiece can be supported on the spring element, at least in the open position. This means that the workpiece is supported, or can be supported, on the spring element, at least in the open position of the tool elements and in the initial state of the spring element, while the workpiece is arranged along the movement direction between the tool elements. In this way, in the open position of the tool elements and in the initial state of the spring element, at least the joining region of the workpiece must be retained, or is retained, by means of the spring element at a distance from the tool element running particularly along the movement direction. In other words, the workpiece is arranged between the tool elements while the tool elements are located in the open position, hence the workpiece is supported against the spring element located in the initial state in such a manner that at least the joining region of the workpiece is spaced apart from the one tool element along the movement direction by means of the spring element, in other words retained at the previously mentioned distance running along the movement direction from the tool element. Consequently, at least the joining region is not in direct contact with the tool element.

The spring element can be elastically deformed through movement of the tool elements along the movement direction into the closed position and can thereby be transferred from the initial state into the deformation state. In other words, the tool elements are moved towards one another and thereby moved out of the open position into the closed position, once the tool has been previously arranged between the tool elements in the described manner and thereby supported on the spring element, hence the spring element is elastically deformed along the movement direction by means of the tool elements and is thereby changed from the initial state into the deformation state. As a result of this, the joining region is, or will be, displaceable or displaced along the movement direction and therefore in the direction of the one tool element. The spring element, in particular the elastic deformation thereof running along the movement direction, therefore allows a displacement of the joining region in the direction of the one tool element, wherein this displacement runs along the movement direction or coincides therewith. In this way, the previously mentioned flow of the material of the auxiliary joining element on the side of the one tool element can be selectively influenced or else guided or defined, particularly by means of the one tool element. On the side of the other tool element, for example, the flow of the material of the auxiliary joining element by means of the other tool element can be selectively influenced or else set or defined, for example. In particular, a particularly advantageous and defined gap between the joining region and the one tool element can be set by means of the spring element or by means of the displacement of the joining region, so that material of the auxiliary joining element can flow into this gap particularly advantageously. The auxiliary joining element on the side of the one tool element can then be particularly advantageously pressed together with the workpiece by means of the one tool element, in particular pressed into the workpiece, so that the previously described flush pressing or pressing-in can be achieved, for example.

Moreover, it is provided according to the invention that in the initial state the spring element is retained movably on the one tool element relative to the one tool element along the movement direction. Consequently, the previously described position or orientation of the spring element relative to the one tool element can be adjusted as required along the movement direction, in other words it can be varied or changed so that the workpiece can be positioned selectively as required and in a defined manner relative to the one tool element and/or relative to the auxiliary joining element, for example. The feature whereby in the initial state the spring element is retained movably on the one tool element relative to the one tool element along the movement direction should be particularly understood to mean that the spring element can be moved along the movement direction and therefore at least in translatory fashion relative to the one tool element while the tool elements are located in the open position, while the spring element adopts its initial state, and while the spring element is retained on the tool element, in other words connected to the one tool element. The spring element is therefore configured as an adjustable spring element, so that the previously mentioned first distance can be set, for example. In other words, multiple values for the first distance that differ from one another can be set as required.

The adjustable spring element makes it possible for an adequate amount of material of the auxiliary joining element to flow on the side of the one tool element, in particular between the workpiece and the one tool element, so that both on the side of the one tool element and also on the side of the other tool element, an adequate amount of material of the auxiliary joining element can flow and consequently the auxiliary joining element can be particularly fixedly connected to the workpiece.

Furthermore, it is conceivable that as a result of, or during, the movement of the tool elements out of the open position into the closed position, the workpiece is reshaped, at least in a partial region. The invention in this case is based particularly on the knowledge that traditionally no prefixing of components is used during the reshaping of workpieces such as metal sheets, for example, in order to move flanges into an exact position, for example. Any spring elements which come into use are customarily standardized elements which are rigid, in other words unmovable, relative to the tool elements. In particular, no technical means are used during the pressing of auxiliary joining elements into corresponding workpieces, in order to position the auxiliary joining elements and the workpieces relative to one another during the pressing-in and to pre-fix them in a precise position. In this case, for manufacturing reasons there may be a deviation of an actual shape from an exact, constructed form, in particular due to tolerances. This deviation is also referred to as a dimensional deviation which can lead to substantial problems. In particular, it may be that although the auxiliary joining element is retained on the workpiece very fixedly in a first direction, it can be easily detached from the workpiece in a second direction opposite the first direction. These problems and disadvantages can be avoided by means of the tool according to the invention.

By adjusting the first distance or else the position or orientation of the spring element relative to the one tool element, the workpiece may, for example, be positioned relative to the one tool element, particularly along the movement direction. In particular, it is thereby possible for the joining region to be positioned or oriented relative to the auxiliary joining element, particularly along the movement direction. In this way, a desired and advantageous orientation of the workpiece relative to the auxiliary joining element can be adjusted, wherein this orientation can be fixed relative to the auxiliary joining element in that the workpiece is supported on the spring element and, by mediation of the spring element, on the one tool element. It is evident overall that the relative orientation of the workpiece to the auxiliary joining element, also referred to as the press-in element, can be adjusted and secured as required by means of the adjustable spring element.

In addition, it is conceivable for the one tool element to be the one of the tool elements which is arranged above the other tool element in a vertical direction. This means that when the movement direction coincides with the vertical direction, for example, the spring element is retained on the upper or lower tool element. In particular, it is conceivable for at least one spring element which can be adjusted in each case to be retained both on the one tool element and also on the other tool element.

It has proved particularly advantageous for at least one particularly hydraulic, pneumatic or otherwise actuable locking element to be used as the fixing element. By means of the fixing element, the workpiece can, for example, be fixed relative to the tool elements and/or relative to the auxiliary joining element, in particular at least during pressing, so that excessive dimensional variations can be avoided.

In particular, the tool according to the invention allows the following advantages to be realized:
  possibility of adjusting the orientation of the workpiece with respect to the auxiliary joining element,
  independence of process variations,
  reduction in process variations,
  increase in accuracy,
  more accurately definable process window,
  less manual reworking,
  increased quality.

In a particularly advantageous embodiment of the invention, the spring element has a first thread, wherein the tool element has a second thread corresponding to the first thread. The spring element is screwed to the one tool element via the thread, by means of which a relative rotation between the spring element and the one tool can be converted into a translatory relative movement running along the movement direction between the spring element and the tool element. As a result of this translatory relative movement between the spring element and the one tool element, the first distance and therefore the previously described orientation or position of the spring element relative to the one tool element can be adjusted in a particularly simple and precise manner.

It has proved particularly advantageous in this case for the first thread to be an outer thread and the second thread an inner thread corresponding to the outer thread. In this way, the first distance can be set particularly easily, in that the spring element is rotated relative to the one tool element, for example. For this purpose, for example, a torque acting around the movement direction is applied to the spring element. In addition, the threads ensure particularly easily that forces acting on the spring element along the movement direction during pressing, for example, do not lead to a change in the first distance or else the orientation or position of the spring element relative to the one tool element, so that a defined and advantageous pressing, or pressing-in, of the auxiliary joining element can be achieved.

The spring element preferably has at least one recess, in particular a slot or a groove, on at least one side, into which a tool, in particular a screw driver, can be inserted. In this way, the tool can interact with the spring element in a form-fitting manner, as a result of which torques can be transferred from the tool to the spring element. Consequently, the spring element can be turned particularly easily relative to the tool element by means of the torque, and thereby adjusted in terms of its height or elevation.

A further embodiment is characterized in that the spring element has a ball segment-shaped head at its end facing away from the one tool element and facing the other tool element, on which head the workpiece can be supported. In this way, the workpiece can be supported in a selective and defined manner, so that the joining region can be retained at the previously mentioned distance from the one tool element along the movement direction in a selective and defined manner.

In a further embodiment of the invention, the spring element is formed from plastic or from a metal material, in particular from steel. In this way, the workpiece can be supported particularly advantageously.

In a further embodiment of the invention, at least one insert is provided which is configured separately from the one tool element and is arranged at least partially in the one tool element, on which insert the auxiliary joining element can be supported, at least during pressing. Very large forces act on the auxiliary joining element during pressing. These forces acting on the auxiliary joining element may be transferred from the auxiliary joining element to the insert and absorbed by the insert. If the insert is subject to wear during series or mass production, for example, it can be detached from the tool element particularly easily and cost-effectively and replaced with a new, unworn insert without having to repair or replace the tool element as a whole. This means that a particularly quick and cost-effective manufacturing process can be guaranteed.

It has proved particularly advantageous in this case for the one tool element and the insert to be formed from different materials from one another. The insert in this case may have a greater hardness than the one tool element, so that excessively rapid wear of the insert can be avoided.

A second aspect of the invention relates to a method for pressing at least one auxiliary joining element together with a workpiece formed separately from the auxiliary joining element by means of a tool, in particular by means of an inventive tool according to the first aspect of the invention. The method comprises a first step in which the workpiece and the auxiliary joining element are arranged between two tool elements which can be moved towards one another along a movement direction and can therefore be moved from an open position into a closed position, in particular while the tool elements are located in the open position. In a second step of the method, the tool elements are particularly moved from the open position into the closed position, while the auxiliary joining element and the workpiece are located between the tool elements. In this way, the auxiliary joining element is pressed together with the workpiece in a joining region of the workpiece.

So that the auxiliary joining element can be particularly advantageously pressed together with the workpiece and therefore particularly fixedly connected to the workpiece, it is provided in a second aspect of the invention that on all tool elements at least one spring element is retained which is elastically deformable along the movement direction and can thereby be transferred from an initial state into a deformation state and adopts the initial state in the open position of the tool elements. The workpiece arranged between the tool elements is supported on the spring element at least in the open position and in the initial state of the spring element, as a result of which at least the joining region of the workpiece is retained by means of the spring element at a distance from the one tool element when the tool elements are in the open position and the spring element is in the initial state.

The spring element is elastically deformed, particularly compressed, by moving the tool elements into the closed position along the movement direction, and thereby transferred from the initial state into the deformation state. In this way, the joining region is displaced along the movement direction and in the direction of the one tool element. As a result of this, material of the auxiliary joining element arranged on the side of the one tool element, for example, can be particularly advantageously deformed and/or caused to flow in particular by means of the one tool element, so that a particularly fixed and, in particular, at least form-fitting connection can be guaranteed between the auxiliary joining element and the workpiece.

In the case of the second aspect of the invention, in the initial state the spring element is retained movably on the one tool element relative to the one tool element along the movement direction. It is preferably provided within the framework of the method that in the initial state and in the open position the spring element is moved relative to the one tool element along the movement direction, particularly in a translatory manner, while the spring element is retained on the one tool, in other words connected to the one tool element. Advantages and advantageous embodiments of the first aspect of the invention should be regarded as advantages and advantageous embodiments of the second aspect of the invention, and vice versa.

Finally, it has proved particularly advantageous for the workpiece to be formed from a first material and the auxiliary joining element from a second material which is different from the first material. The first material is a metal material, for example, in particular a light metal such as aluminum. The second material is preferably a metal material, in particular steel. The auxiliary joining element makes it possible for the previously mentioned structural unit comprising the workpiece and the auxiliary joining element pressed together with the workpiece to be connected, in particular welded, to a further structural element, particularly in a substance-bonded manner, for example by welding the structural element to the auxiliary joining element, particularly by spot welding. In this case, the further structural element and the auxiliary joining element may, for example, be particularly advantageously adapted to one another in respect of their weldability, while the weldability of the further structural element to the workpiece, for example, is inherently impossible or is only possible at great expense. In this way, it is possible for the workpiece and the structural element to be formed from materials which are different from one another. Consequently, the workpiece can be connected to the further structural element particularly advantageously and particularly fixedly by mediation of the auxiliary joining element. For example, the structural element and the auxiliary joining element are created from the same material. In particular, the further structural element can be made of a metal material, in particular steel. The auxiliary joining element therefore makes it possible for different kinds of materials to be particularly advantageously connected to one another, without the workpiece having to be adapted to provide advantageous weldability to the structural element, or vice versa.

Further details of the invention result from the following description of a preferred exemplary embodiment with the associated drawings.

BRIEF DESCRIPTION OF THE DRAWINGS

Identical or functionally identical elements are provided with the same reference numbers in the figures.

DETAILED DESCRIPTION OF THE DRAWINGS

Figure 1:
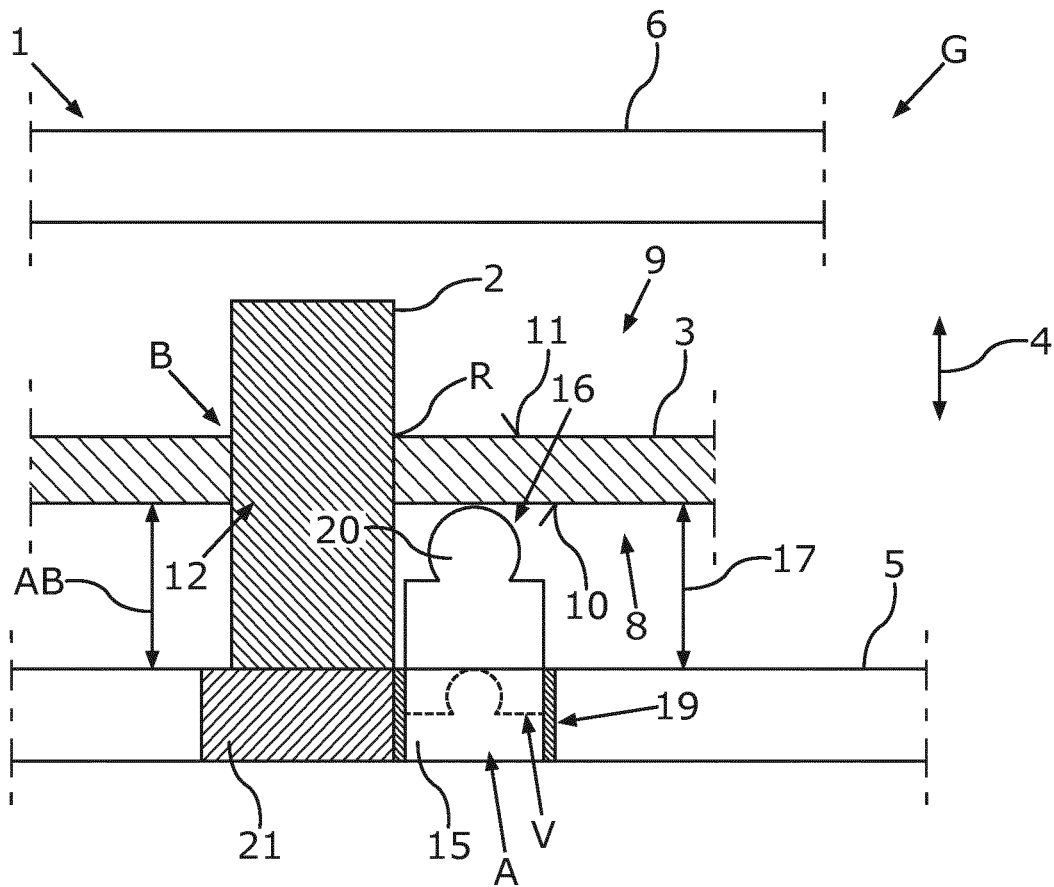
FIG. 1 is a schematic and sectional side detail view of a tool according to an embodiment of the invention for pressing at least one auxiliary joining element together with a workpiece formed separately from the auxiliary joining element, in particular for the manufacture of a vehicle.

FIG. 1 shows by detail in a schematic and sectional side view a tool configured as a press, for example, for pressing at least one auxiliary joining element 2, also referred to as a press-in element, together with a workpiece 3 formed separately from the auxiliary joining element 2. The workpiece 3 is initially a blank or a surface element, for example, which has an at least substantially two-dimensional shape and consequently a planar extent. For example, the workpiece 3 is a metal sheet or a sheet metal part. The workpiece 3 is formed from a first material. In particular, the workpiece 3 may be formed from a light metal, in particular aluminum. The auxiliary joining element 2 is a solid, in other words non-hollow, component. In particular, the auxiliary joining element 2 may be formed from a second material which is different from the first material. The auxiliary joining element 2 is preferably formed from steel.

In the case of the exemplary embodiment shown in FIG. 1, the auxiliary joining element 2 is formed from a solid material, or as a solid material, and is therefore solid, wherein the auxiliary joining element 2 is a slug, in particular a steel slug.

Figure 2:
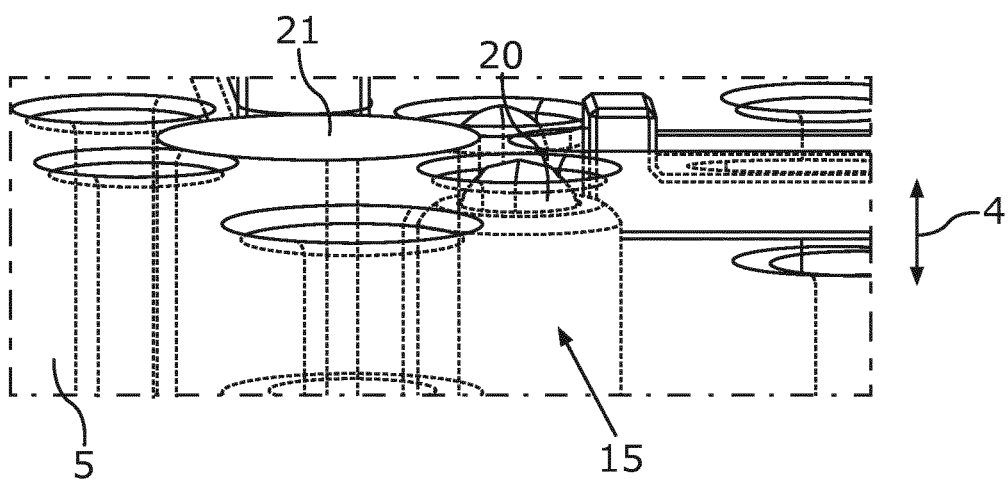
FIG. 2 is a schematic perspective detail view of the tool.

The tool 1 has two tool elements 5 and 6 which can be moved towards one another along a movement direction illustrated by a double arrow 4 in FIG. 1 and therefore from an open position G shown in FIG. 2 into a closed position not shown in the figure, between which tool elements the workpiece 3 and the auxiliary joining element 2 can be arranged or else are arranged, or will be arranged. In this way, the auxiliary joining element 2 can be pressed together with the workpiece 3 in a joining region B of the workpiece 3 through movement of the tool elements into the closed position. In other words, the tool elements 5 and 6 are initially located in the open position G. While the tool elements 5 and 6 are located in the open position G, the workpiece 3 and the auxiliary joining element 2 are arranged between the tool elements 5 and 6, in particular in such a manner that the auxiliary joining element 2 is, or will be, arranged in the joining region B. Thereafter, the tool elements 5 and 6 are moved from the open position G into the closed position, and thereby moved towards one another, as a result of which the auxiliary joining element 2 is pressed together with, and therefore connected to, the workpiece 3. In particular, the auxiliary joining element 2 is pressed into the workpiece 3.

Figure 4:
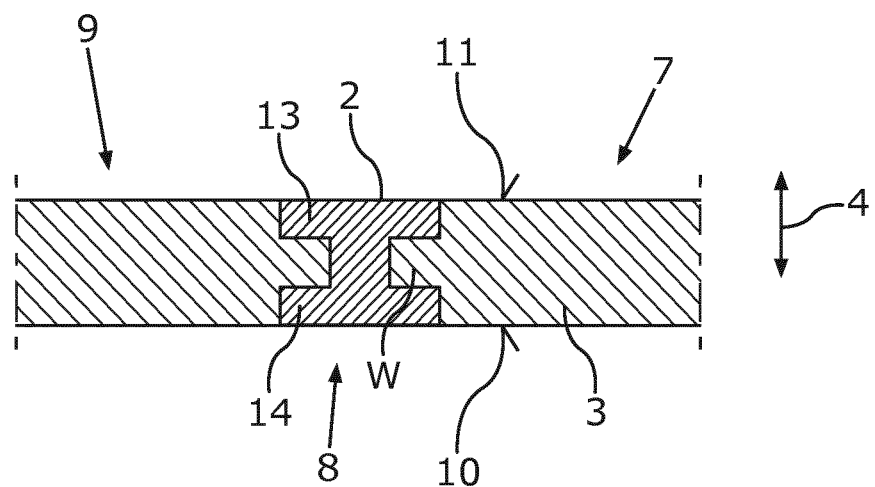
FIG. 4 is a schematic and sectional side detail view of a structural unit which comprises the workpiece and the auxiliary joining element pressed together therewith.

It can be seen from FIG. 4 that through the pressing of the auxiliary joining element 2 together with the workpiece 3, a structural unit 7 is formed or else produced which is used for manufacturing a vehicle, in particular a motor vehicle, for example. The structural unit 7 comprises the workpiece 3 and the auxiliary joining element 2 connected to the workpiece 3. In particular, the pressing is in the form of flush pressing, or flush pressing-in, wherein after pressing, ends of the auxiliary joining element 2 are arranged flush with a respective surface 10 or 11 of the workpiece 3 directly or immediately adjacent to the auxiliary joining element 2, both on a first side 8 and also on a second side 9 of the structural unit 7 facing away from the first side 8.

The auxiliary joining element 2 may be particularly advantageously connected, in particular connected in a substance-bonded manner, to a further structural element not shown in the figure, in that the auxiliary joining element 2 is welded to the other structural element, for example. In this way, it is possible for the workpiece 3 to be particularly advantageously connected, in particular welded, to the other structural element by use of the auxiliary joining element 2.

It can be seen from FIG. 1 that the workpiece 3 itself has an opening formed as a through-hole 12 which is arranged in the joining region B. In other words, the joining region B includes the through-hole 12. The auxiliary joining element 2 in this case is arranged on the workpiece 3 and in the joining region B in such a manner that the auxiliary joining element 2 is arranged in the through-hole 12, in particular fitted through the through-hole 12, particularly in such a manner that the auxiliary joining element 2 initially projects from the through-hole 12 both on side 8, and therefore on the side of the tool element 5, and also on side 9, and therefore on the side of the tool element 6, and the workpiece 3, in particular the surfaces 10 and 11, projects along the movement direction.

An edge region R of the workpiece 3 delimiting the through-hole 12 on side 8 and/or on side 9 may, for example, be touched and therefore comprise at least one phase not shown in the figure.

By pressing the auxiliary joining element 2 together with the workpiece 3, a flow of the second material from which the auxiliary joining element 2 is formed is induced. The second material is also referred to as the material of the auxiliary joining element 2, so that a flow of the material of the auxiliary joining element 2 is brought about by pressing, preferably both on side 8 and also on side 9. In this way, a wall region W of the workpiece 3 identified from FIG. 4 is arranged between two further wall regions 13 and 14 of the joining element 2 spaced apart from one another, for example, wherein the wall regions 13 and 14 are produced by the flow of material, for example. In particular, the wall region W is pressed between the wall regions 13 and 14 or pressed in between the wall regions 13 and 14, so that the auxiliary joining element 2 is connected to the workpiece 3 particularly fixedly both on side 8 and also on side 9.

In order to be able to induce or allow a particularly advantageous flow of the material of the auxiliary joining element 2 on the side of the tool element 5, and also on the side of the tool element 6, so that the auxiliary joining element 2 can be connected particularly fixedly to the workpiece 3, the tool 1 has at least one spring element 15 which is retained on the tool element 5 in the present case, is elastically deformable along the movement direction (double arrow 4) and can thereby be transferred from an initial state A into a deformation state which is not shown, and adopts the initial state A in the open position G, which spring element is also simply referred to as a spring. The spring element 15 can also be seen particularly clearly from FIGS. 2 and 3. On the spring element 15, the workpiece 3 arranged between the tool elements 5 and 6 is supported at least in the open position G and in the initial state A, as a result of which at least the joining region B of the workpiece 3 is retained in the open position G of the tool elements 5 and 6 and in the initial state A of the spring element 15 by means of the spring element 15 at a distance AB from the tool element 5.

If the tool elements 5 and 6 which are then initially open and are located in the open position G are closed, in other words moved into the closed position, the spring element 15 is elastically deformed along the movement direction and compressed in the present case, as a result of which the spring element 15 is transferred from the initial state A into the deformation state.

The deformation state is indicated by dotted lines and labeled V in FIG. 1, for example. In the open position G and in the initial state A, an end 16 of the spring element 15 facing away from the tool element 5 is at a first distance 17 from the tool element 5 running along the movement direction. In the deformation state V, the end 16, for example, is a shorter second distance from the tool element 5 compared with the first distance 17 running along the movement direction, and in the deformation state V the spring element 15 is arranged flush with the tool element 5, in particular with a surface of the tool element 5 facing the tool element 6, or in the deformation state V the spring element 15 is set back away from the tool element 6 compared with the tool element 5. In other words, the first distance 17 is at least reduced or even removed when the spring element 15 is transferred from the initial state A into the deformation state V. By transferring the spring element 15 from the initial state A into the deformation state V, the spring element allows a displacement of the joining region B along the movement direction and during this in the direction of the tool element 5, or during pressing the joining region B is displaced along the movement direction and during this in the direction of the tool element 5, as a result of which the spring element 15 is elastically deformed and therefore changed from the initial state A into the deformation state V.

In the initial state A and in the open position G the spring element 15 in this case is retained movably on the tool element 5 relative to the tool element 5 along the movement direction. This means that the spring element 15 can be moved along the movement direction at least in translatory fashion relative to the tool element 5 and relative to the tool element 6, while the tool elements 5 and 6 adopt the open position G and while the spring element 15 adopts its initial state A. In this way, different values can be set for the distance 17, for example. Once again, in other words, the spring element 15 can be set in relation to its orientation or position relative to the tool element 5 along the movement direction, while the spring element 15 adopts the initial state A and the tool elements 5 and 6 adopt the open position G. By displacing the spring element 15, which adopts the initial state A along the movement direction relative to the tool element 5, the distance AB between the joining region B and the tool element 5 can also be set, so that an orientation or position of the workpiece 3 relative to the auxiliary joining element 2 configured separately from the workpiece 3 can be set.

It can be seen from FIG. 1 that in a state in which the auxiliary joining element 2 and the workpiece 3 are arranged between the tool elements 5 and 6 and the auxiliary joining element 2 penetrates the through-hole 12 so that the auxiliary joining element 2 projects from the through-hole 12 both on side 8 and also on side 9, and thereby projects beyond the workpiece 3, the auxiliary joining element 2 has an extent running along the movement direction. In addition, the workpiece 3 may, for example, be moved along the movement direction relative to the auxiliary joining element 2. By moving or displacing the spring element 15 along the movement direction relative to the tool element 5 and through the change in distance AB associated with this, the workpiece 3 can be moved relative to the auxiliary joining element 2 along the movement direction, in particular while the auxiliary joining element 2 remains at rest along the movement direction and is therefore moved relative to the tool elements 5 and 6. In this way, it is possible for the workpiece 3 to be oriented relative to the auxiliary joining element 2 along the movement direction in such a manner, in other words for the distance AB to be set in such a manner, that the auxiliary joining element 3 will be, or is, arranged in the center of the auxiliary joining element 2 or in the center of the extent of the auxiliary joining element 2. In this way, both on side 8 and also on side 9, an advantageous flow of material of the auxiliary joining element 2 are guaranteed, so that auxiliary joining element 2 can be connected particularly advantageously and, in particular, particularly fixedly to the workpiece 3 on both sides 8 and 9.

Figure 3:
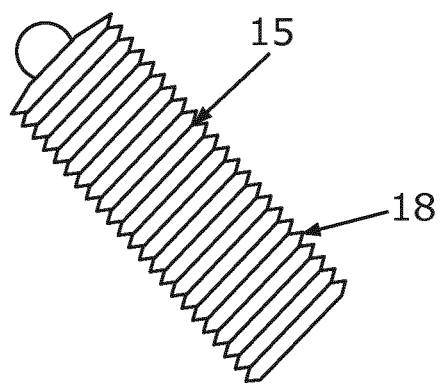
FIG. 3 is a schematic and perspective plan view of a spring element of the tool.

It can be seen particularly clearly when viewed in conjunction with FIG. 3 that the spring element has a first thread 18 and the tool element 5 has a second thread 19 corresponding to the first thread 18, wherein the spring element 15 is screwed to the tool element 5 via the thread 18 and 19. By means of the thread 18 and 19, a relative rotation between the spring element 15 and the tool element 5 can be converted into a translatory relative movement running along the movement direction (double arrow 4) between the spring element 15 and the tool element 5, as a result of which the spring element 15 can be set in relation to its orientation or position along the movement direction. The spring element is therefore configured as an adjustable spring element. By setting the orientation or position of the spring element 15 along the movement direction, the distance AB or the first distance 17 can be set as required. In the present case, the first thread 18 is configured as an outer thread, while the second thread 19 is configured as an inner thread corresponding to the outer thread. The outer thread in this case is screwed into the inner thread, so that the spring element 15 is screwed into the tool element 5.

Moreover, the spring element 15 has at its end 16 facing away from the tool element 5, which end faces the tool element 6, a ball segment-shaped head 20 which can be particularly clearly identified from FIG. 1. The head 20 allows a defined supporting of the workpiece 3, so that the distance 17 or AB can be set as required. In this way, the workpiece 3 can be positioned particularly as required relative to the auxiliary joining element 2 along the movement direction and retained in a desired position.

Moreover, the tool 1 has at least one insert 21 formed separately from the tool element 5 and separately from the tool element 6 and arranged at least partially, in particular at least predominantly or completely, in the tool element 5, on which the insert the auxiliary joining element 2 can be supported, or is supported, at least during pressing, particularly along the movement direction and thereby to the tool element 5. When there has been the appropriate amount of wear to the insert 21, the insert 21 can be dismantled and exchanged for a new insert which is not worn, without the entire tool element having to be repaired or replaced. In this case, it is preferably provided that the tool element 5 and the insert 21 are created from materials which are different from one another.

LIST OF REFERENCE NUMBERS

1 Tool
2 Auxiliary joining element
3 Workpiece
4 Double arrow
5 Tool element
6 Tool element
7 Structural unit
8 Side
9 Side
10 Surface
11 Surface
12 Through-hole
13 Wall region
14 Wall region 15 Spring element
16 End
17 Distance
18 First thread
19 Second thread
20 Head
21 Insert
A Initial state
AB Distance
B Joining region
G Open position
R Edge region
V Deformation state
W Wall region

What is claimed is:

1. A tool for pressing at least one auxiliary joining element together with a workpiece formed separately from the auxiliary joining element, comprising:
    two tool elements which are movable towards one another along a movement direction from an open position into a closed position, between which two tool elements the workpiece and the auxiliary joining element are arrangeable, so that the auxiliary joining element is pressable together with the workpiece in a joining region of the workpiece through movement of the two tool elements into the closed position;
    at least one spring element retained on one of the two tool elements, wherein
    the at least one spring element is elastically deformable along the movement direction and is transferrable from an initial state into a deformation state and adopts the initial state in the open position of the two tool elements, on which spring element the workpiece is supportable, at least in the open position, as a result of which in the open position of the two tool elements and in the initial state of the spring element at least the joining region of the workpiece is retained by the spring element at a distance from one of the two tool elements,
    the at least one spring element is elastically deformable through movement of the tool elements along the movement direction into the closed position and is transferrable from the initial state into the deformation state, as a result of which at least the joining region is displaced along the movement direction and in the direction of the one tool element,
    the at least one spring element is retained on the one tool element and is movable in the initial state relative to at least the one tool element along the movement direction, and
    the at least one spring element is elastically deformable along the movement direction such that the spring element has a first length extending along the movement direction in the initial state and has a second length extending along the movement direction in the deformation state, wherein the second length is smaller than the first length.

2. The tool according to claim 1, wherein
    the spring element has a first thread,
    the one tool element has a second thread, and
    the spring element is screwed to the one tool element via the first and second threads, by which a relative rotation between the spring element and the one tool element is converted into a translatory relative movement extending along the movement direction between the spring element and the one tool element.

3. The tool according to claim 2, wherein
    the first thread is an outer thread and the second thread is an inner thread corresponding to the outer thread.

4. The tool according to claim 1, wherein
    the spring element has a ball segment-shaped head at an end facing away from the one tool element and facing the other tool element, on which head the workpiece is supportable.

5. The tool according to claim 1, further comprising:
    at least one insert which is configured separately from the one tool element and is arranged at least partially in the one tool element, on which insert the auxiliary joining element is supportable, at least during pressing.

6. The tool according to claim 5, wherein
    the one tool element and the insert are formed of different materials.

7. A method for pressing at least one auxiliary joining element together with a workpiece formed separately from the auxiliary joining element, the method comprising:
    arranging the workpiece and the auxiliary joining element between two tool elements of a tool, which two tool elements are movable towards one another along a movement direction from an open position into a closed position;
    retaining at least one spring element on one of the two tool elements, wherein
    the spring element is elastically deformable along the movement direction and transferrable from an initial state into a deformation state and adopts the initial state in the open position of the two tool elements, on which spring element the workpiece arranged between the tool elements is supportable, at least in the open position, as a result of which in the open position of the two tool elements and in the initial state of the spring element at least the joining region of the workpiece is retained by the spring element at a distance from the one tool element,
    the spring element is elastically deformable through movement of the two tool elements along the movement direction into the closed position and transferrable from the initial state into the deformation state, as a result of which at least the joining region is displaced along the movement direction and in the direction of the one tool element;
    the spring element is elastically deformable along the movement direction such that the spring element has a first length extending along the movement direction in the initial state and has a second length extending along the movement direction in the deformation state, wherein the second length is smaller than the first length; and
    moving the two tool elements into the closed position, while the auxiliary joining element and the workpiece are located between the tool elements, as a result of which the auxiliary joining element is pressed together with the workpiece in the joining region of the workpiece.

8. The method according to claim 7, wherein
    the spring element is moved along the movement direction at least in translatory fashion relative to the one tool element, while the spring element adopts its initial state and is retained on the one tool element.

9. The method according to claim 7, wherein
    the workpiece is formed from a first material and the auxiliary joining element from a second material which is different from the first material.

* * * * *